(12) United States Patent
Seki et al.

(10) Patent No.: US 12,107,438 B2
(45) Date of Patent: Oct. 1, 2024

(54) POWER RECEIVING DEVICE

(71) Applicant: TOYODA GOSEI CO., LTD., Kiyosu (JP)

(72) Inventors: Hideki Seki, Kiyosu (JP); Shinichiro Fuki, Kiyosu (JP); Teppei Yamakoshi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 18/172,474

(22) Filed: Feb. 22, 2023

(65) Prior Publication Data

US 2023/0283113 A1 Sep. 7, 2023

(30) Foreign Application Priority Data

Mar. 2, 2022 (JP) .................................. 2022-031881

(51) Int. Cl.
*H02J 50/27* (2016.01)
*H02J 7/00* (2006.01)

(52) U.S. Cl.
CPC ........ *H02J 50/27* (2016.02); *H02J 7/007192* (2020.01); *H02J 2207/20* (2020.01)

(58) Field of Classification Search
CPC ... H02J 50/27; H02J 7/007192; H02J 2207/20
See application file for complete search history.

(56) References Cited

U.S. PATENT DOCUMENTS

| | | | |
|---|---|---|---|
| 9,774,211 B2* | 9/2017 | Kasturi | H02J 50/12 |
| 2011/0193417 A1* | 8/2011 | Hirasaka | H04W 12/065 |
| | | | 307/104 |
| 2015/0372493 A1* | 12/2015 | Sankar | H02J 50/60 |
| | | | 307/104 |
| 2016/0127012 A1 | 5/2016 | Shylendra et al. | |
| 2016/0156388 A1 | 6/2016 | Zeine et al. | |
| 2016/0299210 A1 | 10/2016 | Zeine | |
| 2016/0299549 A1 | 10/2016 | Zeine et al. | |
| 2016/0300547 A1 | 10/2016 | El-Rukby et al. | |
| 2016/0301217 A1 | 10/2016 | Zeine et al. | |
| 2016/0301240 A1 | 10/2016 | Zeine et al. | |
| 2016/0301243 A1 | 10/2016 | Zeine et al. | |
| 2016/0301255 A1 | 10/2016 | Zeine | |
| 2016/0301256 A1 | 10/2016 | Zeine et al. | |
| 2016/0301258 A1 | 10/2016 | Zeine et al. | |
| 2016/0301259 A1 | 10/2016 | Zeine et al. | |
| 2016/0301264 A1 | 10/2016 | Zeine et al. | |
| 2017/0041046 A1 | 2/2017 | Shylendra et al. | |
| 2017/0141620 A1 | 5/2017 | Zeine et al. | |
| 2017/0141621 A1 | 5/2017 | Zeine et al. | |
| 2017/0187231 A1 | 6/2017 | Zeine et al. | |
| 2017/0187249 A1 | 6/2017 | Zeine et al. | |

(Continued)

FOREIGN PATENT DOCUMENTS

JP 6725531 B2 7/2020

*Primary Examiner* — Carlos Amaya
(74) *Attorney, Agent, or Firm* — Posz Law Group, PLC

(57) ABSTRACT

A power receiving device includes a power receiving antenna, a rectifier circuit, and a bias circuit. The power receiving antenna is configured to receive radio waves for supplying power. The rectifier circuit includes a rectifier diode and is configured to convert radio waves received by the power receiving antenna into a DC power. The bias circuit is configured to apply a DC bias to the rectifier diode.

4 Claims, 4 Drawing Sheets

(56) References Cited

U.S. PATENT DOCUMENTS

| | | | |
|---|---|---|---|
| 2018/0255596 A1 | 9/2018 | Zeine et al. | |
| 2018/0259615 A1 | 9/2018 | Zeine | |
| 2018/0366085 A1 | 12/2018 | Zeine et al. | |
| 2019/0020199 A1 | 1/2019 | Zeine et al. | |
| 2019/0140490 A1 | 5/2019 | Zeine et al. | |
| 2019/0157915 A1 | 5/2019 | Zeine et al. | |
| 2019/0197984 A1 | 6/2019 | Zeine et al. | |
| 2019/0199404 A1 | 6/2019 | Shylendra et al. | |
| 2019/0305604 A1 | 10/2019 | Zeine et al. | |
| 2020/0296780 A1 | 9/2020 | Zeine et al. | |
| 2020/0303954 A1 | 9/2020 | Zeine et al. | |
| 2021/0049975 A1 | 2/2021 | El-Rukby et al. | |
| 2021/0063525 A1 | 3/2021 | Zeine | |
| 2021/0135593 A1* | 5/2021 | Feng | H02N 2/00 |
| 2021/0249903 A1 | 8/2021 | Zeine et al. | |
| 2021/0249908 A1 | 8/2021 | Zeine et al. | |
| 2021/0321472 A1 | 10/2021 | Zeine et al. | |
| 2021/0373117 A1 | 12/2021 | Zeine | |

* cited by examiner

POWER RECEIVING DEVICE

BACKGROUND

1. Field

The present disclosure relates to a power receiving device used in radio wave wireless power supply.

2. Description of Related Art

Wireless power supply, which supplies power to electronic devices without making contact, has been known (see Japanese Patent No. 6725531). This publication discloses radio wave wireless power supply.

A power transmitting device used in the radio wave wireless power supply includes a power transmitting antenna. The power transmitting antenna transmits radio waves (for example, microwaves) for supplying power. A power receiving device used in the radio wave wireless power supply includes a power receiving antenna and a rectifier circuit. The power receiving antenna receives radio waves transmitted from the power transmitting device. The rectifier circuit includes a current rectifying diode. The rectifier circuit converts the radio waves received by the power receiving antenna into DC power. Then, the converted DC power is used as a power source for electric devices or used to charge storage batteries incorporated in the electric devices.

Radio waves used for wireless power supply are attenuated during spatial propagation. Therefore, even when the power transmitting device transmits radio waves having a constant intensity, the intensity of the radio waves received by the power receiving antenna of the power receiving device decreases as the power transfer distance (specifically, the propagation distance of the radio waves) increases during the wireless power supply.

When the intensity of the radio waves received by the power receiving antenna is less than or equal to a certain level, the rectifier circuit of the power receiving device cannot convert the radio waves into DC power due to its circuit structure. In the power receiving device, such a limit of performance of the rectifier circuit determines the limit of power receiving performance (specifically, the range in which power can be received).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a power receiving device used in radio wave wireless power supply is provided. The power receiving device includes a power receiving antenna that is configured to receive radio waves for supplying power, a rectifier circuit that includes a rectifier diode and is configured to convert radio waves received by the power receiving antenna into a DC power, and a bias circuit that is configured to apply a DC bias to the rectifier diode.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A power receiving device 20 according to one embodiment will now be described.

Figure 1:
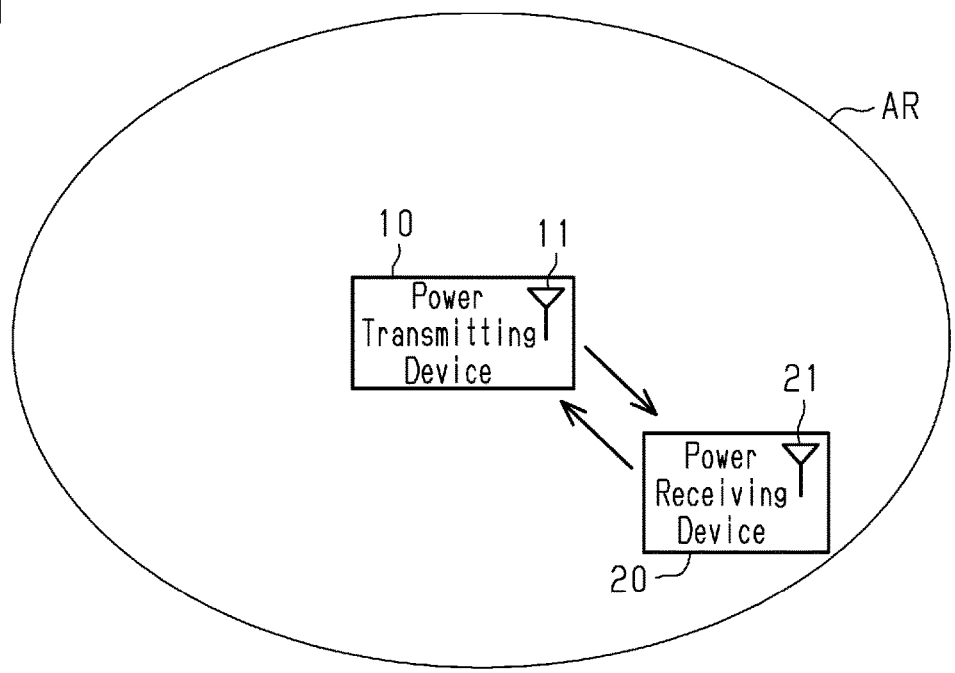
FIG. 1 is a schematic diagram showing a relationship between a power receiving device and a power transmitting device according to an embodiment.

As shown in FIG. 1, the power receiving device 20 of the present embodiment is charged with power transmitted from a power transmitting device 10. The power transmitting device 10 supplies power to the power receiving device 20 by radio wave wireless power supply. Specifically, radio waves for supplying power (microwaves in the present embodiment) are transmitted and received between a power transmitting antenna 11 of the power transmitting device 10 and a power receiving antenna 21 of the power receiving device 20.

The power receiving device 20 transmits a beacon signal including location information to the power transmitting device 10 at predetermined time intervals. When the power receiving device 20 is present in a power transferable range AR, the power transmitting device 10 receives the beacon signal from the power receiving device 20. Upon receiving the beacon signal from the power receiving device 20, the power transmitting device 10 identifies the location of the power receiving device 20 based on the beacon signal. The power transmitting device 10 wirelessly supplies power to the power receiving device 20 by transmitting radio waves (power transfer signal) toward the identified location. This efficiently supplies power to the power receiving device 20 in accordance with, for example, the orientation of the power receiving device 20 with respect to the power transmitting device 10 and the distance between power transmitting device 10 and power receiving device 20.

<Power Transmitting Device 10>

Figure 2:
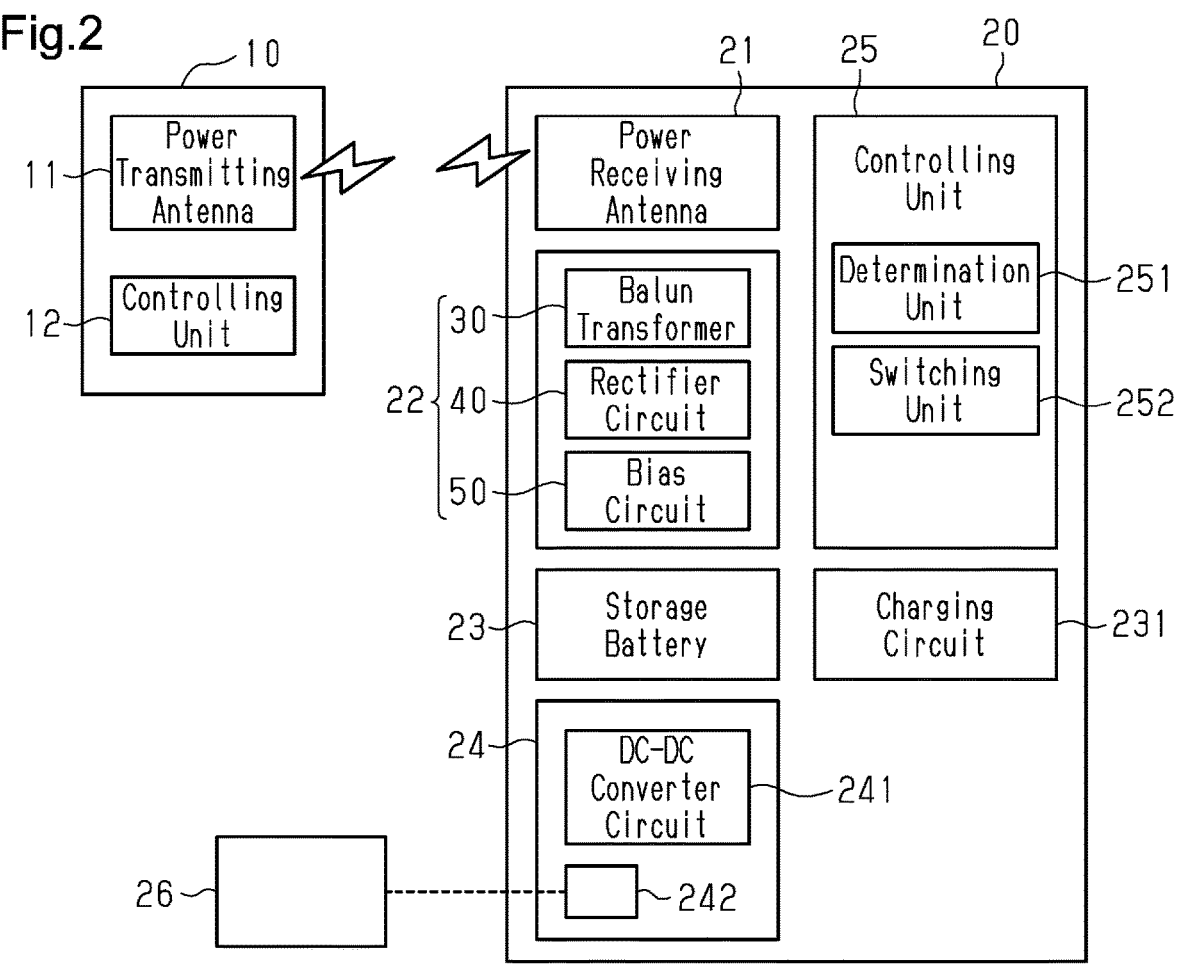
FIG. 2. is a block diagram showing a configuration of the power receiving device and the power transmitting device.

As shown in FIG. 2, the power transmitting device 10 includes the power transmitting antenna 11, and a controlling unit 12.

The power transmitting antenna 11 is used for various types of communication with the power receiving device 20. The power transmitting antenna 11 is used to transmit power transfer signals and to receive beacon signals.

The controlling unit 12 may include, for example, a microcontroller unit. The controlling unit 12 is processing circuitry that includes a processor and a memory unit. The memory unit includes a read-only memory (ROM) and a random-access memory (RAM).

The controlling unit 12 performs various types of control related to communication with the power receiving device 20. The controlling unit 12 controls the power transmitting antenna 11 to receive beacon signals transmitted by the power receiving device 20. The controlling unit 12 converts power supplied from a power supply device (not shown) into a power transfer signal and transmits the power transfer signal using the power transmitting antenna 11.

<Power Receiving Device 20>

The power receiving device 20 of the present embodiment includes the power receiving antenna 21, a reception-side conversion unit 22, a storage battery 23, an output unit 24, and a controlling unit 25.

The power receiving antenna 21 and the reception-side conversion unit 22 form a portion that receives power transmitted from the power transmitting device 10 through radio wave wireless power supply.

<Power Receiving Antenna 21>

The power receiving antenna 21 is used for various types of communication with the power transmitting device 10. Specifically, the power receiving antenna 21 is used for receiving power transfer signals transmitted from the power transmitting device 10 and for transmitting a beacon signal to the power transmitting device 10.

<Reception-Side Conversion Unit 22>

The reception-side conversion unit 22 forms a portion that converts the power transfer signal received by the power receiving antenna 21 into DC power. In the power receiving device 20 of the present embodiment, the DC power converted by the reception-side conversion unit 22 is supplied to the storage battery 23 to charge the storage battery 23.

Figure 3:
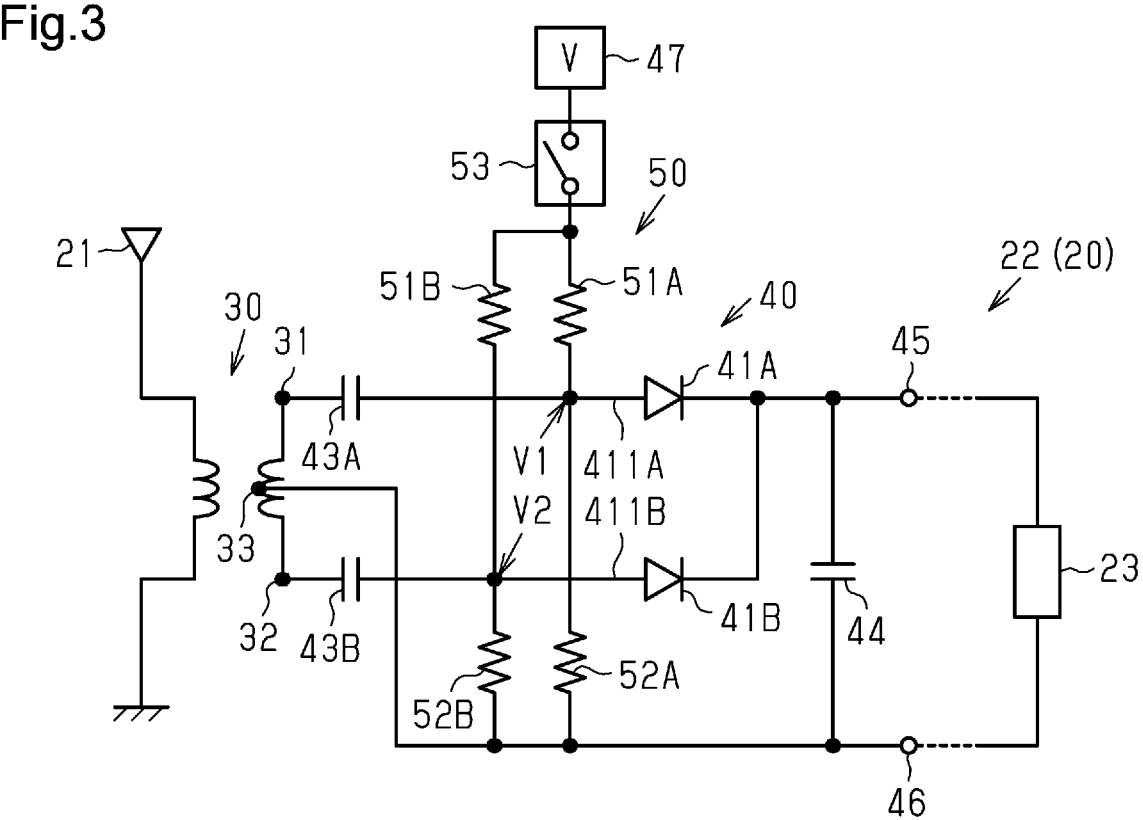
FIG. 3 is a circuit diagram showing an electric circuit structure of a reception-side conversion unit of the power receiving device.

As shown in FIG. 3, the reception-side conversion unit 22 includes a balun transformer 30, a rectifier circuit 40, and a bias circuit 50.

<Balun Transformer 30>

The balun transformer 30 is used to convert a power transfer signal (unbalanced signal) received by the power receiving antenna 21 into a balanced signal. The input side of the balun transformer 30 is connected to the power receiving antenna 21. The output side of the balun transformer 30 is connected to the rectifier circuit 40. The balun transformer 30 achieves impedance matching between the power receiving antenna 21 and the rectifier circuit 40.

<Rectifier Circuit 40>

The rectifier circuit 40 is a circuit that converts radio waves received by the power receiving antenna 21 (specifically, the output of the balun transformer 30) into DC power. A single-phase full-wave rectifier circuit is used as the rectifier circuit 40.

The rectifier circuit 40 includes two rectifier diodes 41A, 41B, two capacitors 43A, 43B, and a smoothing capacitor 44.

The first capacitor 43A and the first rectifier diode 41A are provided so as to connect a first output tap 31 of the balun transformer 30 and a positive output portion 45 of the rectifier circuit 40 to each other. The first capacitor 43A and the first rectifier diode 41A are arranged in that order from the side closer to the first output tap 31 while being connected in series.

The second capacitor 43B and the second rectifier diode 41B are provided so as to connect a second output tap 32 of the balun transformer 30 and the positive output portion 45 to each other. The second capacitor 43B and the second rectifier diode 41B are arranged in that order from the side closer to the second output tap 32 while being connected in series.

The smoothing capacitor 44 is provided so as to connect the positive output portion 45 (specifically, the cathodes of the rectifier diodes 41A, 41B) and a ground output portion 46 of the rectifier circuit 40 to each other. The ground output portion 46 is connected to a center tap 33 of the balun transformer 30.

The output terminals of the rectifier circuit 40 (the positive output portion 45 and the ground output portion 46) are connected to the storage battery 23 via a charging circuit 231. The charging circuit 231 is a circuit that adjusts the power (specifically, a charging current and a charging voltage) supplied to the storage battery 23. In the present embodiment, the DC power converted by the rectifier circuit 40 is supplied to the storage battery 23 via the charging circuit 231 to charge the storage battery 23.

<Bias Circuit 50>

The bias circuit 50 is a circuit that applies a DC bias to the rectifier diodes 41A, 41B.

The bias circuit 50 includes a voltage dividing resistance circuit that includes a first resistor 51A and a second resistor 52A. The first resistor 51A and the second resistor 52A are fixed resistors. The first resistor 51A is provided so as to connect a power source 47 of the rectifier circuit 40 and an anode 411A of the first rectifier diode 41A to each other. The second resistor 52A is provided so as to connect the ground of the rectifier circuit 40 (specifically, the ground output portion 46) and the anode 411A of the first rectifier diode 41A to each other.

In the present embodiment, the voltage dividing resistance circuit (the first resistor 51A and the second resistor 52A) divides the power source voltage. The divided voltage is applied to the anode 411A of the first rectifier diode 41A as a DC bias voltage V1. In the present embodiment, the relationship among the power source voltage, the resistance value of the first resistor 51A, and the resistance value of the second resistor 52A is determined such that the DC bias voltage V1 and a forward voltage Vf of the first rectifier diode 41A are equal to each other.

The bias circuit 50 includes a voltage dividing resistance circuit that includes a first resistor 51B and a second resistor 52B. The first resistor 51B and the second resistor 52B are fixed resistors. The first resistor 51B is provided so as to connect the power source 47 of the rectifier circuit 40 and an anode 411B of the second rectifier diode 41B to each other. The second resistor 52B is provided so as to connect the ground of the rectifier circuit 40 (specifically, the ground output portion 46) and an anode 411B of the second rectifier diode 41B to each other.

In the present embodiment, the voltage dividing resistance circuit (the first resistor 51B and the second resistor 52B) divides the power source voltage. The divided voltage is applied to the anode 411B of the second rectifier diode 41B as a DC bias voltage V2. In the present embodiment, the relationship among the power source voltage, the resistance value of the first resistor 51B, and the resistance value of the second resistor 52B is determined such that the DC bias voltage V2 and a forward voltage Vf of the second rectifier diode 41B are equal to each other.

<Changeover Switch 53>

The bias circuit 50 includes a changeover switch 53. The power source 47 and each voltage dividing resistance circuit (specifically, the first resistors 51A, 51B) are connected to each other via the changeover switch 53.

When the changeover switch 53 is turned on, the power source 47 is connected to each voltage dividing resistance circuit. At this time, since the power source voltage is applied to each voltage dividing resistance circuit, the DC bias voltages V1, V2 are applied to the rectifier diodes 41A, 41B, respectively. When the changeover switch 53 is turned off, the power source 47 is disconnected from each voltage dividing resistance circuit. At this time, since the power source voltage is not applied to each voltage dividing resistance circuit, the DC bias voltages V1, V2 are not applied to the rectifier diodes 41A, 41B. In the present embodiment, a state in which a DC bias is applied to each of the rectifier diodes 41A, 41B (ON state) and a state in which a DC bias is not applied to the rectifier diodes 41A, 41B (OFF state) are switched through operation control of the changeover switch 53.

<Output Unit 24>

As shown in FIG. 2, the output unit 24 forms a portion that outputs the power stored in the storage battery 23 to an electric device 26 to be charged. The electric device 26 may be, for example, a smartphone, a tablet terminal, and wireless earphones.

The output unit 24 includes a DC-DC converter circuit 241 and a connecting portion 242. The DC-DC converter circuit 241 is connected to the storage battery 23. The DC-DC converter circuit 241 receives DC power stored in the storage battery 23. The DC-DC converter circuit 241 increases the voltage of the DC power input from the storage battery 23 to a voltage suitable to be output from the output unit 24. The DC-DC converter circuit 241 is connected to the connecting portion 242. The connecting portion 242 is a connection cable for electrically connecting the DC-DC converter circuit 241 and the electric device 26 to each other.

When the electric device 26 is charged by the power receiving device 20, the electric device 26 is connected to the connecting portion 242. The DC-DC converter circuit 241 increases the voltage of the DC power input from the storage battery 23, and outputs the DC power of the increased voltage to the electric device 26 via the connecting portion 242. In this manner, the electric device 26 (specifically, a built-in storage battery) is charged with the DC power output.

<Controlling Unit 25>

The controlling unit 25 may include, for example, a microcontroller unit. The controlling unit 25 is processing circuitry that includes a processor and a memory unit. The memory unit includes a ROM and a RAM. The controlling unit 25 executes various kinds of control related to operation control of the power receiving device 20. The controlling unit 25 controls the power receiving antenna 21 to transmit a beacon signal to the power transmitting device 10. The controlling unit 25 controls the power receiving antenna 21 to receive power transfer signals transmitted from the power transmitting device 10. The controlling unit 25 controls operation of the changeover switch 53. The controlling unit 25 controls operation of the output unit 24.

The controlling unit 25 includes a determination unit 251 and a switching unit 252 as its functional units.

<Determination Unit 251>

The determination unit 251 determines whether the power receiving antenna 21 is in a state of receiving radio waves (reception state). Specifically, when the operation mode of the power receiving antenna 21 is a reception mode for receiving the radio waves, the determination unit 251 determines that the power receiving antenna 21 is in the reception state. On the other hand, when the operation mode of the power receiving antenna 21 is an operation mode other than the reception mode, such as a transmission mode in which the power receiving antenna 21 transmits a beacon signal, the determination unit 251 determine that the power receiving antenna 21 is not in the reception state. The result of determination by the determination unit 251 is stored in the storage unit of the controlling unit 25.

<Switching Unit 252>

The switching unit 252 switches a mode in which a DC bias is applied to each of the rectifier diodes 41A, 41B in accordance with the result of the determination by the determination unit 251. Specifically, when the determination unit 251 determines that the power receiving antenna 21 is in the reception state, the switching unit 252 turns on the changeover switch 53. As a result, the DC bias voltages V1, V2 are respectively applied to the rectifier diodes 41A, 41B of the rectifier circuit 40. When the determination unit 251 determines that the power receiving antenna 21 is not in the reception state, the switching unit 252 turns off the changeover switch 53. As a result, the DC bias voltages V1, V2 are not applied to the rectifier diodes 41A, 41B of the rectifier circuit 40.

<Operation>

Operation of the power receiving device 20 according to the present embodiment will now be described.

As shown in FIG. 1, the power receiving device 20 controls the power receiving antenna 21 to transmit a beacon signal. The power transmitting device 10 controls the power transmitting antenna 11 to receive the beacon signal transmitted by the power receiving device 20. Upon receiving the beacon signal, the power transmitting device 10 controls the power transmitting antenna 11 to transmit a power transfer signal to the power receiving device 20.

When the power transmitting device 10 is in a state of transmitting a power transfer signal, the power receiving device 20 switches the operation mode of the power receiving antenna 21 to a power receiving mode. As a result, when the operation mode of the power receiving antenna 21 is the power receiving mode, the changeover switch 53 of the bias circuit 50 (FIG. 3) is turned on, so that the DC bias voltages V1, V2 are respectively applied to the rectifier diodes 41A, 41B of the rectifier circuit 40.

The power receiving device 20 receives the power transfer signal by controlling the operation of the power receiving antenna 21 in a state in which the DC bias voltages V1, V2 are applied to the rectifier diodes 41A, 41B. Then, the power transfer signal is converted into DC power by the reception-side conversion unit 22 of the power receiving device 20, and the DC power is supplied to the storage battery 23 via the charging circuit 231. The storage battery 23 is charged with the DC power supplied in this manner.

When the electric device 26 is connected to the connecting portion 242 of the power receiving device 20, the power receiving device 20 transforms the DC power stored in the storage battery 23 and outputs the transformed DC voltage to the electric device 26. In this manner, the electric device 26 (specifically, a built-in storage battery) is charged with the DC power output.

<Advantages>

The present embodiment achieves the following advantages.

(1) The power receiving device 20 is used in radio wave wireless power supply. The power receiving device 20 includes the power receiving antenna 21, the rectifier circuit 40, which includes the rectifier diodes 41A, 41B, and the bias circuit 50, which applies DC bias voltages V1, V2 to the rectifier diodes 41A, 41B.

Typically, when a rectifier circuit including rectifier diodes is used, radio waves received by a power receiving antenna cannot be converted into DC power in a region where the intensity of the radio waves is low (low-intensity region) due to the influence of a forward voltage Vf of the rectifier diodes.

In this regard, the present embodiment allows the DC bias voltages V1, V2 to be applied to the rectifier diodes 41A, 41B when the power receiving device 20 receives radio waves. DC voltage corresponding to the forward voltage Vf (specifically, a forward bias voltage) is thus applied across each of the rectifier diodes 41A. 41B. Accordingly, it is possible to limit the influence of the forward voltage Vf on the power conversion by the rectifier circuit 40.

Figure 4:
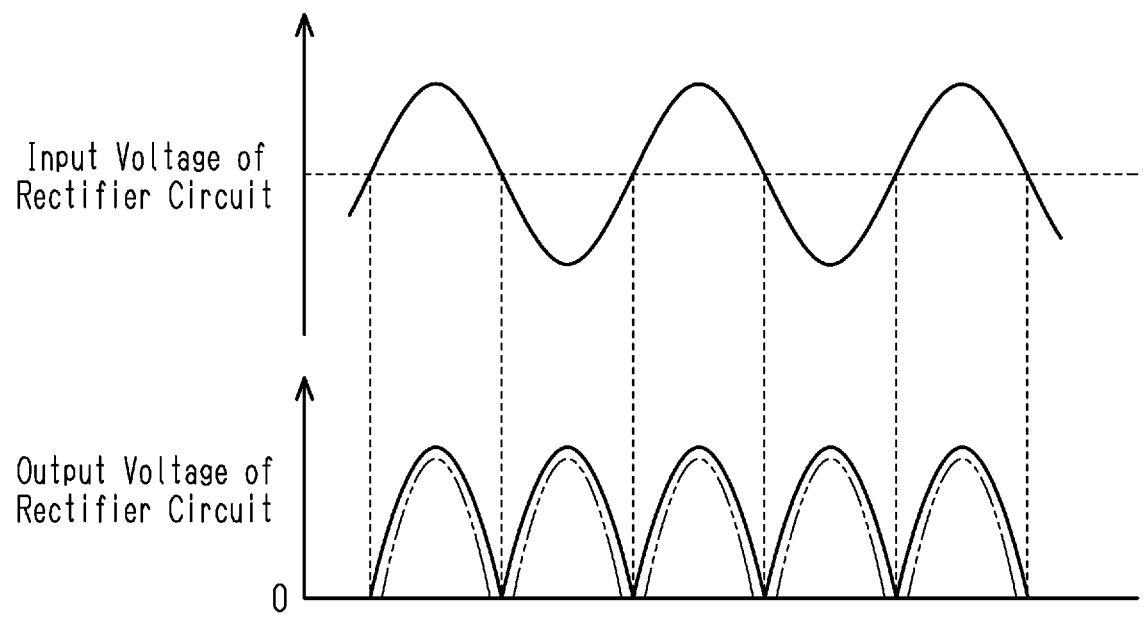
FIG. 4 is an explanatory diagram of operation of the embodiment.

As a result, current flows through the rectifier diodes 41A, 41B even in a low-intensity region. Therefore, as shown in FIG. 4, the rectifier circuit 40 converts radio waves into DC power even in the low-intensity region. In order to facilitate understanding of power conversion in a low-intensity region, FIG. 4 shows an example of a manner in which a rectifier circuit 40 that does not include a smoothing capacitor 44 converts power. The solid lines in FIG. 4 represent an example of a manner in which the rectifier circuit 40 of the present embodiment coverts power. The long-dash double-short-dash lines in FIG. 4 represent an example of a manner in which a rectifier circuit of a comparative example that does not include a bias circuit 50 converts power.

Since the present embodiment allows the rectifier circuit 40 to convert power in a low-intensity region, DC power can be obtained by the power conversion by the rectifier circuit 40 even at a position distant from the power transmitting device 10. This expands the range of positions at which DC power is obtained by power conversion by the rectifier circuit 40, that is, the range of positions at which the power receiving device 20 receives power. The present embodiment thus improves the power receiving performance of the power receiving device 20.

(2) The controlling unit 25 of the power receiving device 20 includes the determination unit 251 and the switching unit 252 as its functional units. The determination unit 251 determines whether the power receiving antenna 21 is in the reception state, in which the receiving antenna 21 receives radio waves. When the determination unit 251 determines that the receiving antenna 21 is in the reception state, the switching unit 252 causes the DC bias voltages V1, V2 to be applied to the rectifier diodes 41A, 41B. When the determination unit 251 determines that the receiving antenna 21 is not in the reception state, the switching unit 252 prevents the DC bias voltages V1, V2 from being applied to the rectifier diodes 41A, 41B. That is, the controlling unit 25 determines whether the power receiving antenna 21 is in the reception state, in which the receiving antenna 21 receives radio waves. When determining that the receiving antenna 21 is in the reception state, the controlling unit 25 causes the DC bias voltages V1, V2 to be applied to the rectifier diodes 41A, 41B. When determining that the receiving antenna 21 is not in the reception state, the controlling unit 25 prevents the DC bias voltages V1, V2 from being applied to the rectifier diodes 41A, 41B.

With the present embodiment, when radio waves are received by the power receiving antenna 21, that is, when power conversion is performed by the rectifier circuit 40, the DC bias voltages V1, V2 are applied to the rectifier diodes 41A, 41B. This improves the power receiving performance of the power receiving device 20. In addition, when radio waves are not received by the power receiving antenna 21, that is, when power conversion is not performed by the rectifier circuit 40, unnecessary power consumption is prevented since the DC bias voltages V1, V2 are not applied to the rectifier diodes 41A, 41B.

(3) The bias circuit 50 includes a voltage dividing resistance circuit that includes the first resistor 51A and the second resistor 52A. The first resistor 51A is provided so as to connect a power source 47 of the rectifier circuit 40 and an anode 411A of the first rectifier diode 41A to each other. The second resistor 52A is provided so as to connect the ground output portion 46 of the rectifier circuit 40 and the anode 411A of the first rectifier diode 41A to each other. The bias circuit 50 includes a voltage dividing resistance circuit that includes the first resistor 51B and the second resistor 52B. The first resistor 51B is provided so as to connect the power source 47 and the anode 411B of the second rectifier diode 41B to each other. The second resistor 52B is provided so as to connect the ground output portion 46 and the anode 411B of the second rectifier diode 41B to each other. With the present embodiment, a specified DC voltage is generated using the power source 47 of the rectifier circuit 40 and each voltage dividing resistance circuit, and the generated voltage is applied to the rectifier diodes 41A, 41B as the DC bias voltages V1, V2.

<Modifications>

The above-described embodiment may be modified as follows. The above-described embodiment and the following modifications can be combined as long as the combined modifications remain technically consistent with each other.

The first resistors 51A, 51B and/or the second resistors 52A, 52B may include thermistors.

The forward voltage Vf of the rectifier diodes 41A, 41B changes in accordance with the temperature of the rectifier diodes 41A, 41B. In other words, the DC bias required for improving the power receiving performance changes in accordance with the temperature of the rectifier diodes 41A, 41B.

With the above-described configuration, since some of the resistors of the voltage dividing resistance circuit include thermistors, it is possible to change the DC bias voltage generated by the voltage dividing resistance circuit in accordance with the temperature of the rectifier diodes 41A, 41B (specifically, the temperature of the thermistors). Thus, the DC bias voltage suitable for improving the power receiving performance is applied to the rectifier diodes 41A, 41B in accordance with the temperature of the rectifier diodes 41A, 41B (specifically, the temperature characteristics of the forward voltage Vf). In the above-described configuration, it is preferable to employ thermistors having temperature characteristics satisfying the following [condition]. [Condition] Even when the temperature of the rectifier diodes 41A, 41B changes, the forward voltage Vf of the rectifier diodes 41A, 41B and the voltage divided by the voltage dividing resistance circuit (that is, the DC bias voltage) agree with each other.

Figure 5:
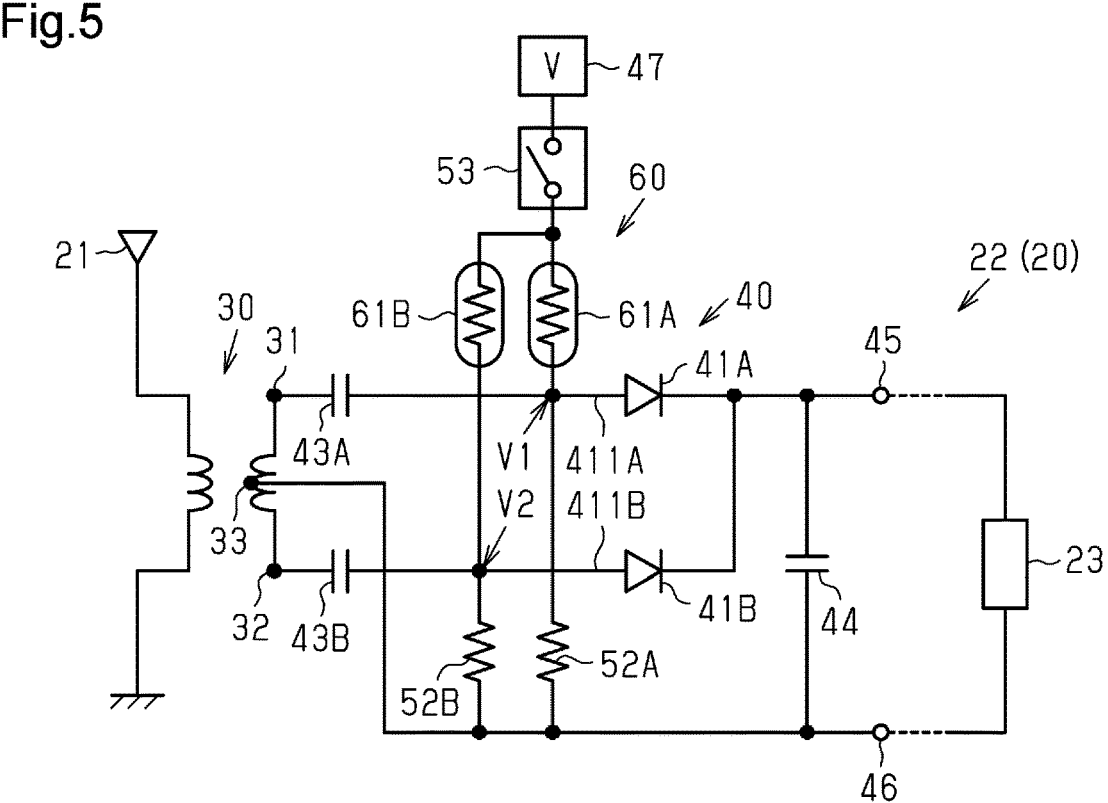
FIG. 5 is a circuit diagram showing an electric circuit structure of a reception-side conversion unit according to a modification.

FIG. 5 shows an example of the above-described configuration. In FIG. 5, like or the same reference numerals or corresponding reference numerals are given to those components that are similar to the corresponding components of the reception-side conversion unit 22 in the above-described embodiment shown in FIG. 3, and detailed explanations are omitted.

In the example shown in FIG. 5, first resistors 61A, 61B of a bias circuit 60 include positive temperature coefficient (PTC) thermistors. The second resistors 52A, 52B of the bias circuit 60 include fixed resistors.

The forward voltage Vf of the rectifier diodes 41A, 41B decreases as the temperature of the rectifier diodes 41A, 41B increases. In this regard, in the present example, as the temperature of the first resistors 61A, 61B (PTC thermistors) increases, the resistance values of the first resistors 61A, 61B increase, so that the voltage divided by the voltage dividing resistance circuit (DC bias voltage) decreases. Therefore, with the present example, a DC bias voltage corresponding to the temperature of the rectifier diodes 41A, 41B (specifically, the temperature characteristics of the forward voltage Vf) is applied to the rectifier diodes 41A, 41B.

Figure 6:
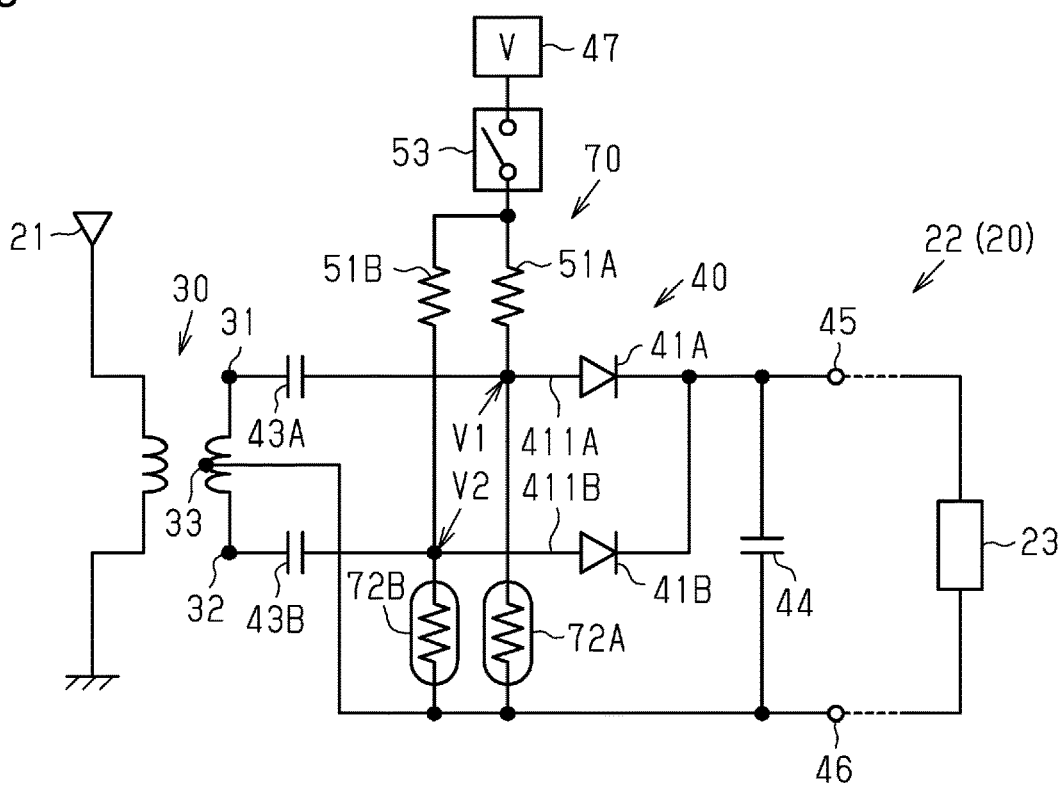
FIG. 6 is a circuit diagram showing an electric circuit structure of a reception-side conversion unit according to a modification.

FIG. 6 shows another example of the above-described configuration. In FIG. 6, like or the same reference numerals or corresponding reference numerals are given to those components that are similar to the corresponding components of the reception-side conversion unit 22 in the above-described embodiment shown in FIG. 3, and detailed explanations are omitted.

In the example shown in FIG. 6, first resistors 51A, 51B of a bias circuit 70 include fixed resistors. Second resistors 72A, 72B of the bias circuit 70 include NTC thermistors.

As described above, the forward voltage Vf of the rectifier diodes 41A, 41B decreases as the temperature of the rectifier diodes 41A, 41B increases. In this regard, in the present example, as the temperature of the second resistors 72A, 72B (NTC thermistors) increases, the resistance values of the second resistors 72A, 72B decrease, so that the voltage divided by the voltage dividing resistance circuit (DC bias voltage) decreases. Therefore, with the present example, a DC bias voltage corresponding to the temperature of the rectifier diodes 41A, 41B (specifically, the temperature characteristics of the forward voltage Vf) is applied to the rectifier diodes 41A, 41B.

Figure 7:
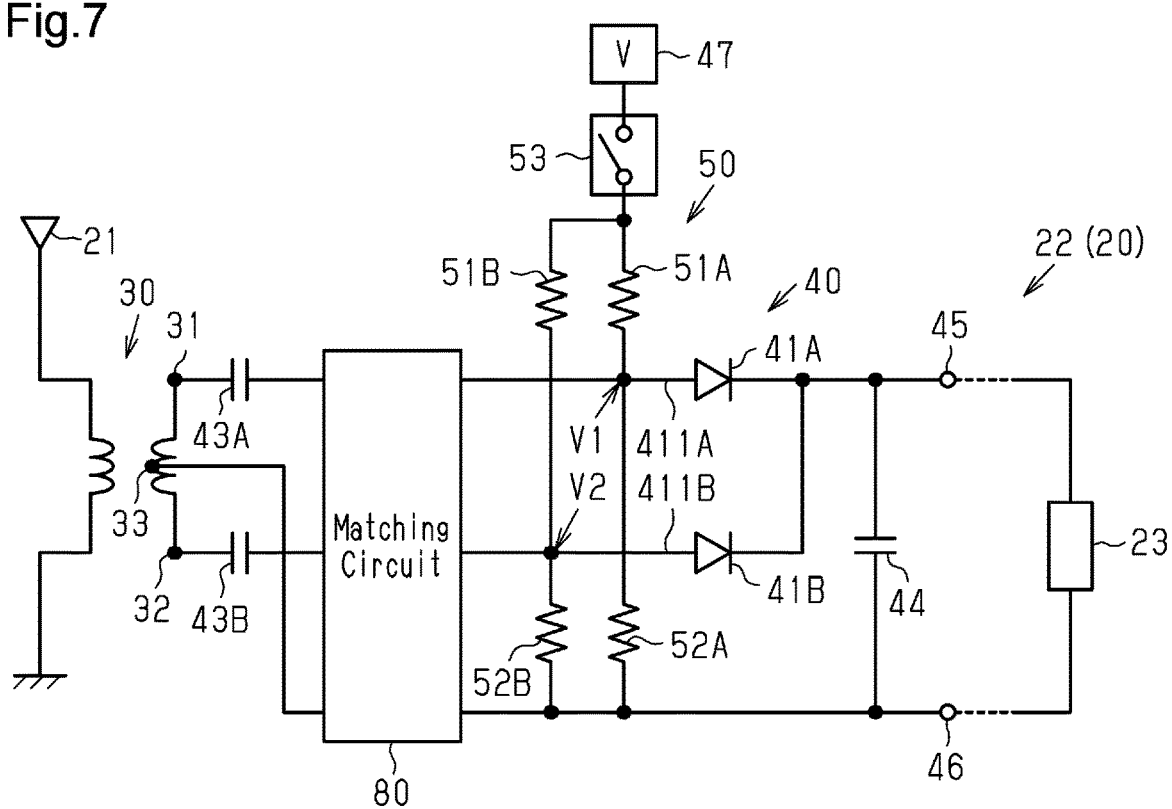
FIG. 7 is a circuit diagram showing an electric circuit structure of a reception-side conversion unit according to a modification.

As in an example shown in FIG. 7, a matching circuit 80 may be provided between the balun transformer 30 and the rectifier circuit 40. The matching circuit 80 may be used to achieve impedance matching with higher power conversion efficiency between the power receiving antenna 21 and the rectifier circuit 40.

A detecting unit that detects a temperature index value TD of the rectifier diodes 41A, 41B may be provided. In addition, the controlling unit 25 may execute a process of setting a DC bias based on the temperature index value TD. In this process, the DC bias voltage may be set such that the DC bias voltage decreases as the temperature index value TD increases. With the above-described configuration, the DC bias voltage suitable for improving the power receiving performance is applied to the rectifier diodes 41A, 41B in accordance with the temperature of the rectifier diodes 41A, 41B (specifically, the temperature characteristics of the forward voltage Vf).

Figure 8:
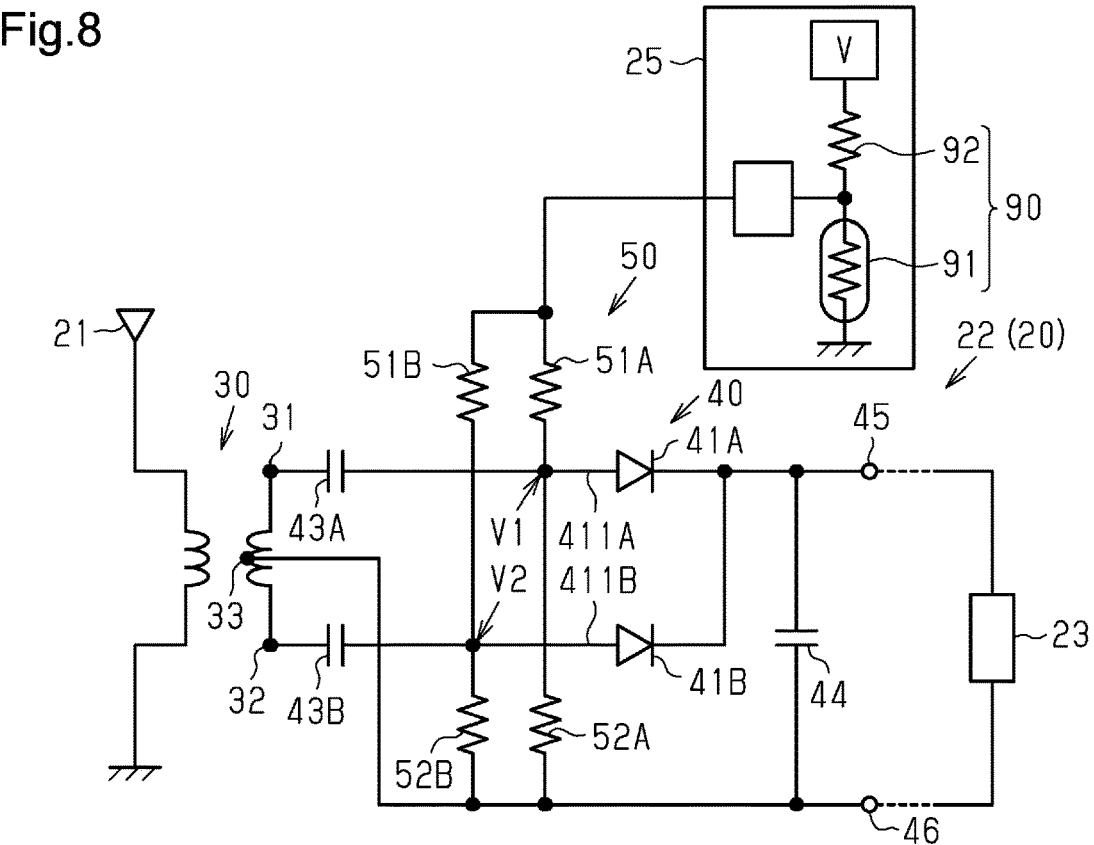
FIG. 8 is a circuit diagram showing an electric circuit structure of a reception-side conversion unit according to a modification.

FIG. 8 shows an example of the above-described configuration. In FIG. 8, like or the same reference numerals or corresponding reference numerals are given to those components that are similar to the corresponding components of the reception-side conversion unit 22 in the above-described embodiment shown in FIG. 3, and detailed explanations are omitted.

As shown in FIG. 8, the controlling unit 25 includes a voltage dividing resistance circuit 90 in which a negative temperature coefficient (NTC) thermistor 91 and a fixed resistor 92 are connected in series. In the voltage dividing resistance circuit 90, the NTC thermistor 91 serves as a resistor on the ground side, and the fixed resistor 92 serves as a resistor on the power source side. A voltage value divided by the voltage dividing resistance circuit 90 is detected as the temperature index value TD of the rectifier diodes 41A, 41B. In the present example, the temperature index value TD is a value corresponding to the temperature of the controlling unit 25. Specifically, the temperature index value TD indicates a lower voltage for a higher temperature of the controlling unit 25. In the present example, the voltage dividing resistance circuit 90 corresponds to a detecting unit.

The controlling unit 25 is connected to each of the voltage dividing resistance circuits (specifically, the first resistors 51A, 51B). In the present example, the voltage applied to the voltage dividing resistance circuit can be adjusted by the controlling unit 25. In the present example, the controlling unit 25 reduces the voltage applied to the voltage dividing resistance circuit as the voltage indicated by the temperature index value TD decreases. Thus, the DC bias voltage is set such that the DC bias voltage decreases as the temperature index value TD increases.

In the above-described configuration, the voltage dividing resistance circuit 90 may be replaced with a voltage dividing resistance circuit in which a fixed resistor and a PTC thermistor are connected in series. The voltage dividing resistance circuit may be, for example, a circuit in which a fixed resistor serves as a resistor on the ground side and a PTC thermistor serves as a resistor on the power source side. In this configuration, the voltage dividing resistance circuit corresponds to a detecting unit.

In the above-described configuration, the voltage dividing resistance circuit 90 may be replaced with a temperature sensor for detecting the temperature index value TD of the rectifier diodes 41A, 41B. The temperature sensor can be provided at any suitable position, for example, in the controlling unit 25 or in the vicinity of the rectifier diodes 41A, 41B.

The changeover switch 53 of the bias circuit 50 may be omitted. That is, a DC bias voltage may be always applied to the rectifier diodes 41A, 41B.

The power receiving device according to the above-described embodiment may be any power receiving device as long as the power receiving device includes a rectifier circuit having a rectifier diode. Other than the above-described full-wave rectifier, the rectifier circuit may be a half-wave rectifier circuit having only one rectifier diode, or a full-wave rectifier circuit having four rectifier diodes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A power receiving device used in radio wave wireless power supply, the power receiving device comprising:
   a power receiving antenna that is configured to receive radio waves for supplying power;
   a rectifier circuit that includes a rectifier diode and is configured to convert radio waves received by the power receiving antenna into a DC power; and
   a bias circuit that is configured to apply a DC bias to the rectifier diode, wherein:
   the bias circuit includes a voltage dividing resistance circuit that includes a first resistor and a second resistor,
   the first resistor connects a power source of the rectifier circuit and an anode of the rectifier diode to each other, and
   the second resistor connects a ground of the rectifier circuit and the anode of the rectifier diode to each other.

2. The power receiving device according to claim 1, further comprising
   processing circuitry, wherein
   the processing circuitry is configured to
      determine that the power receiving antenna is in a state of receiving the radio waves; and
      switch a manner in which the DC bias is applied to the rectifier diode such that, when determining that the power receiving antenna is in the state of receiving the radio waves, the DC bias is applied to the rectifier diode, and that, when determining that the power receiving antenna is not in the state of receiving the radio waves, the DC bias is not applied to the rectifier diode.

3. The power receiving device according to claim 1, wherein at least one of the first resistor and the second resistor is a thermistor.

4. A power receiving device used in radio wave wireless power supply, the power receiving device comprising:
   a power receiving antenna that is configured to receive radio waves for supplying power;
   a rectifier circuit that includes a rectifier diode and is configured to convert radio waves received by the power receiving antenna into a DC power;
   a bias circuit that is configured to apply a DC bias to the rectifier diode;
   a detecting unit that is configured to detect a temperature index value of the rectifier diode; and
   processing circuitry configured to set the DC bias based on the temperature index value detected by the detecting unit.

* * * * *